US012064076B2

(12) United States Patent
Ford

(10) Patent No.: US 12,064,076 B2
(45) Date of Patent: Aug. 20, 2024

(54) REUSABLE DRINKING STRAW WASHING APPARATUS

(71) Applicant: Wylen Stone William Ford, Kokomo, IN (US)

(72) Inventor: Wylen Stone William Ford, Kokomo, IN (US)

( * ) Notice: Subject to any disclaimer, the term of this patent is extended or adjusted under 35 U.S.C. 154(b) by 514 days.

(21) Appl. No.: 17/387,586

(22) Filed: Jul. 28, 2021

(65) Prior Publication Data

US 2021/0353126 A1 Nov. 18, 2021

Related U.S. Application Data

(63) Continuation-in-part of application No. 16/941,297, filed on Jul. 28, 2020, now abandoned.

(60) Provisional application No. 62/887,818, filed on Aug. 16, 2019.

(51) Int. Cl.

| | |
|---|---|
| ***A47L 15/00*** | (2006.01) |
| ***A47L 15/44*** | (2006.01) |
| ***A47L 15/46*** | (2006.01) |
| *B08B 3/04* | (2006.01) |

(52) U.S. Cl.

CPC ....... *A47L 15/4436* (2013.01); *A47L 15/0078* (2013.01); *A47L 15/0089* (2013.01); *A47L 15/44* (2013.01); *A47L 15/46* (2013.01); *B08B 3/041* (2013.01)

(58) Field of Classification Search

CPC .. A47L 15/0078; A47L 15/0089; A47L 15/44; A47L 15/4436; B08B 3/041

See application file for complete search history.

(56) References Cited

U.S. PATENT DOCUMENTS

| | | | |
|---|---|---|---|
| 3,968,901 A | 7/1976 | Peva, Jr. | |
| 7,363,093 B2 | 4/2008 | King | |
| 2017/0340153 A1 | 11/2017 | Wise-Jarvis | |
| 2020/0086363 A1* | 3/2020 | Bowman | A47L 15/0089 |

FOREIGN PATENT DOCUMENTS

| | | |
|---|---|---|
| CN | 104337487 B | 2/2015 |
| CN | 206285082 U | 6/2017 |
| CN | 207327376 U | 5/2018 |

(Continued)

*Primary Examiner* — Joseph L. Perrin
*Assistant Examiner* — Irina Graf

(57) ABSTRACT

The present invention is a drinking straw washing machine with a washing region, a sanitizing region, a straw retaining track, and a motor assembly. The washing region comprises a washing cogwheel rotatably positioned therein that receives straws via the straw retaining track. The washing cogwheel and sanitizing cogwheel are oriented parallel to the straw retaining track. The motor assembly is mechanically coupled to the washing cogwheel and thereby rotates the washing cogwheel to guide straws along the straw retaining track and through a cleaning solution included in the wash region. the sanitizing region comprises a sanitizing cogwheel rotatably positioned therein that receive straws from the washing region via the straw retaining track. The motor assembly is mechanically coupled to the sanitizing cogwheel and thereby rotates the sanitizing cogwheel to guide straws along the straw retaining track, through a sanitizing solution in the sanitizing region, and out of the sanitizing region.

9 Claims, 12 Drawing Sheets

(56) References Cited

FOREIGN PATENT DOCUMENTS

| | | | | |
|---|---|---|---|---|
| CN | 108577739 | A | | 9/2018 |
| DE | 102011052846 | A1 | | 5/2012 |
| JP | 2009126689 | A | | 6/2009 |
| JP | 2011160874 | A | * | 8/2011 |
| KR | 20130006252 | A | | 1/2013 |

* cited by examiner

REUSABLE DRINKING STRAW WASHING APPARATUS

CROSS-REFERENCE TO RELATED APPLICATIONS

This application claims priority to U.S. Utility application Ser. No. 16/941,297 filed Jul. 28, 2020, which is hereby incorporated herein by reference.

FIELD OF THE INVENTION

The present disclosure relates generally to automatic washing machines. More specifically, the present disclosure describes a novel assembly for retaining and sanitizing the interior and exterior of many reusable drinking straws simultaneously. Further consideration is given to the capacity to process multiple individual batches of reusable drinking straws concurrently.

BACKGROUND OF THE INVENTION

In present times, non-biodegradable drinking straws are a common utensil sold and offered freely by commercial restaurants and grocers. These conventional drinking straws are generally accepted to be single-use, disposable items by most users, however the materials used to produce such straws are known to persist long after the straws have been disposed of. The environmental impact of this cumulative mass of plastics is a recognized hazard that has recently been addressed by public legislation banning the use of such single-use straws or mandating their manufacture from more eco-friendly materials such as plant fibers or paper. In response, durable straws formed from denser polymers, plastics, or metallic materials have become increasingly available on the market. Reusable straws enable a customer to condense costs for drinking straws into a one-time, upfront purchase to avoid both the cost and hassle of acquiring biodegradable straws.

Avoidance of excessive waste may also be a priority for the environmentally minded consumer, encouraging those individuals to seek a means to minimize their impact by foregoing recurring wasteful practices. However, with the repeated use of such utensils consumers are now required to cleanse their reusable straws—a requirement that had not been commonplace prior to the recognition and banning of conventional disposable straws. It is therefore contemplated that a means of effectively cleaning and sanitizing a large volume of reusable straws simultaneously is presently absent from, yet desirable to a segment of the market today.

BRIEF DESCRIPTION OF THE DRAWINGS

Some of the embodiments will be described in detail, with reference to the following figures, wherein like designations denote like members, wherein.

Figure 1:
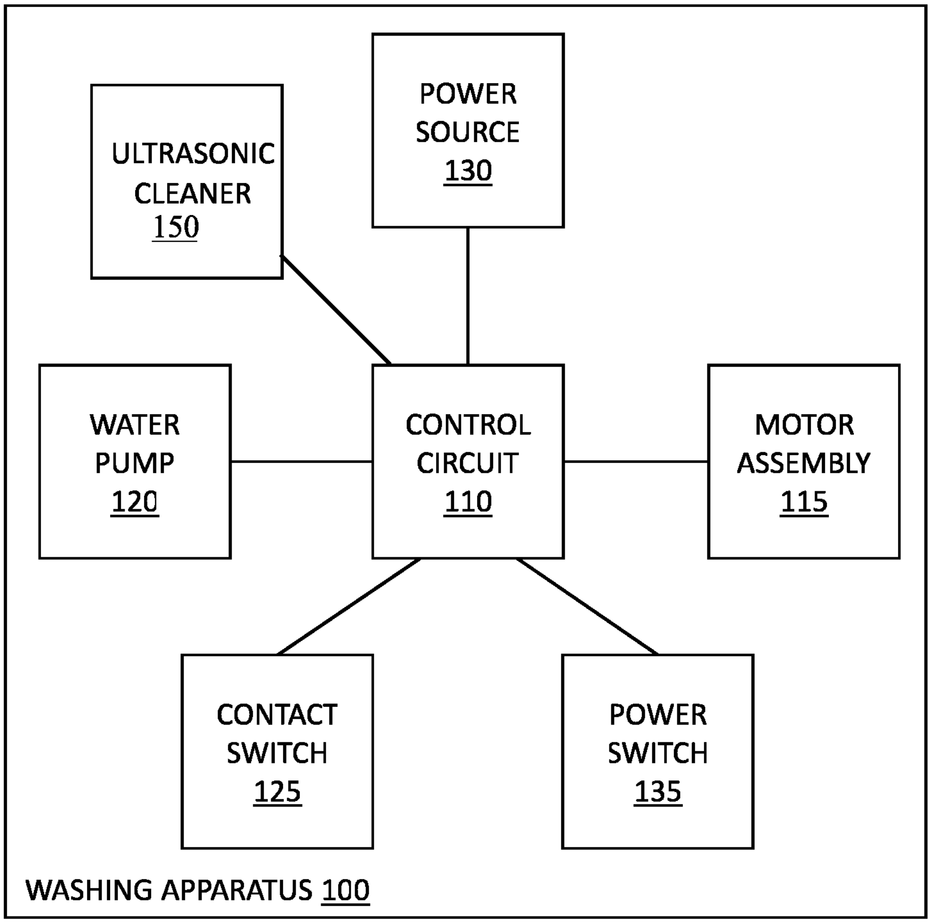
FIG. 1 depicts a block diagram of electronic components of a reusable drinking straw washing apparatus, according to some embodiments.
Figure 2:
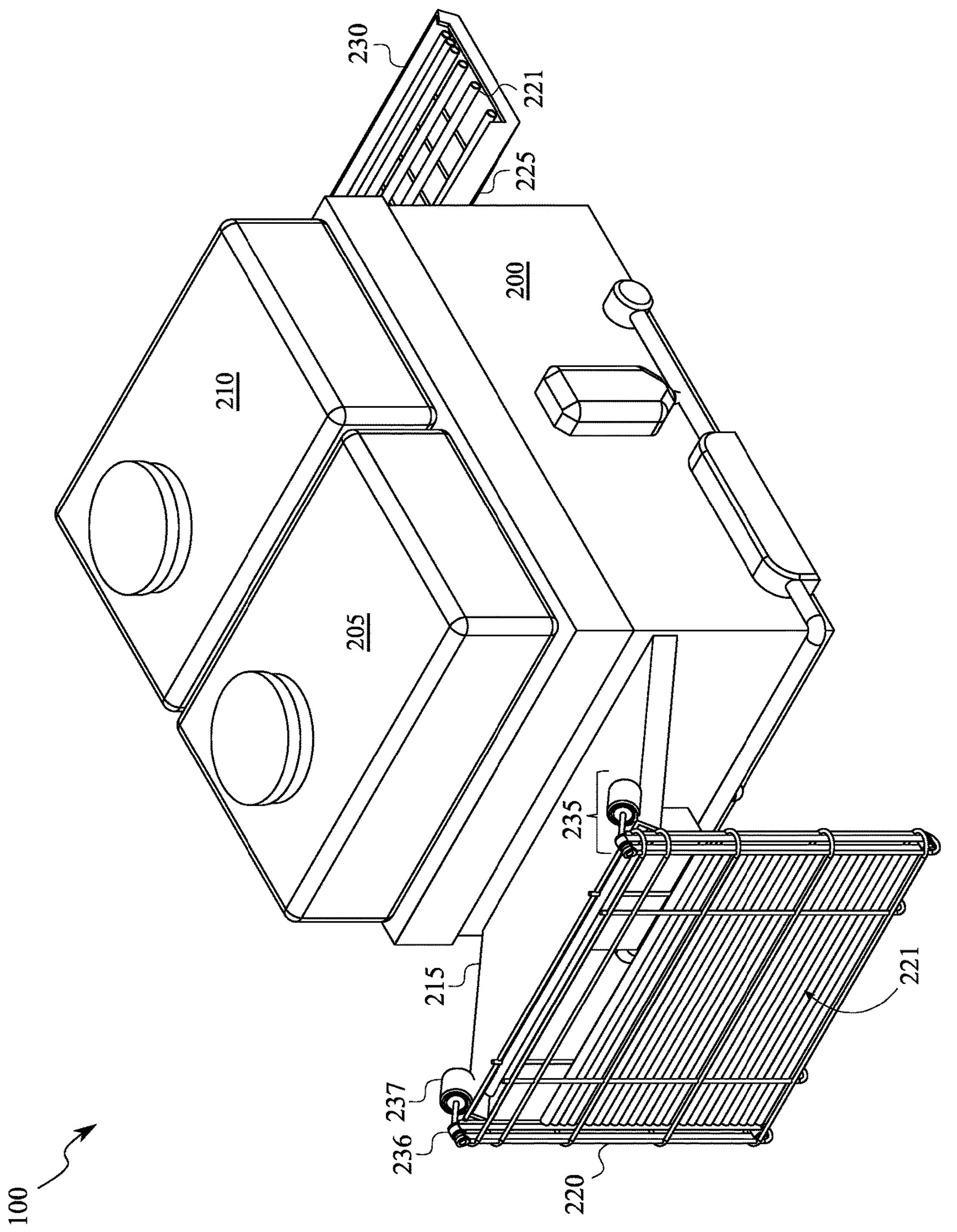
FIG. 2 illustrates a perspective view of a straw washing apparatus, according to other embodiments.
Figure 3:
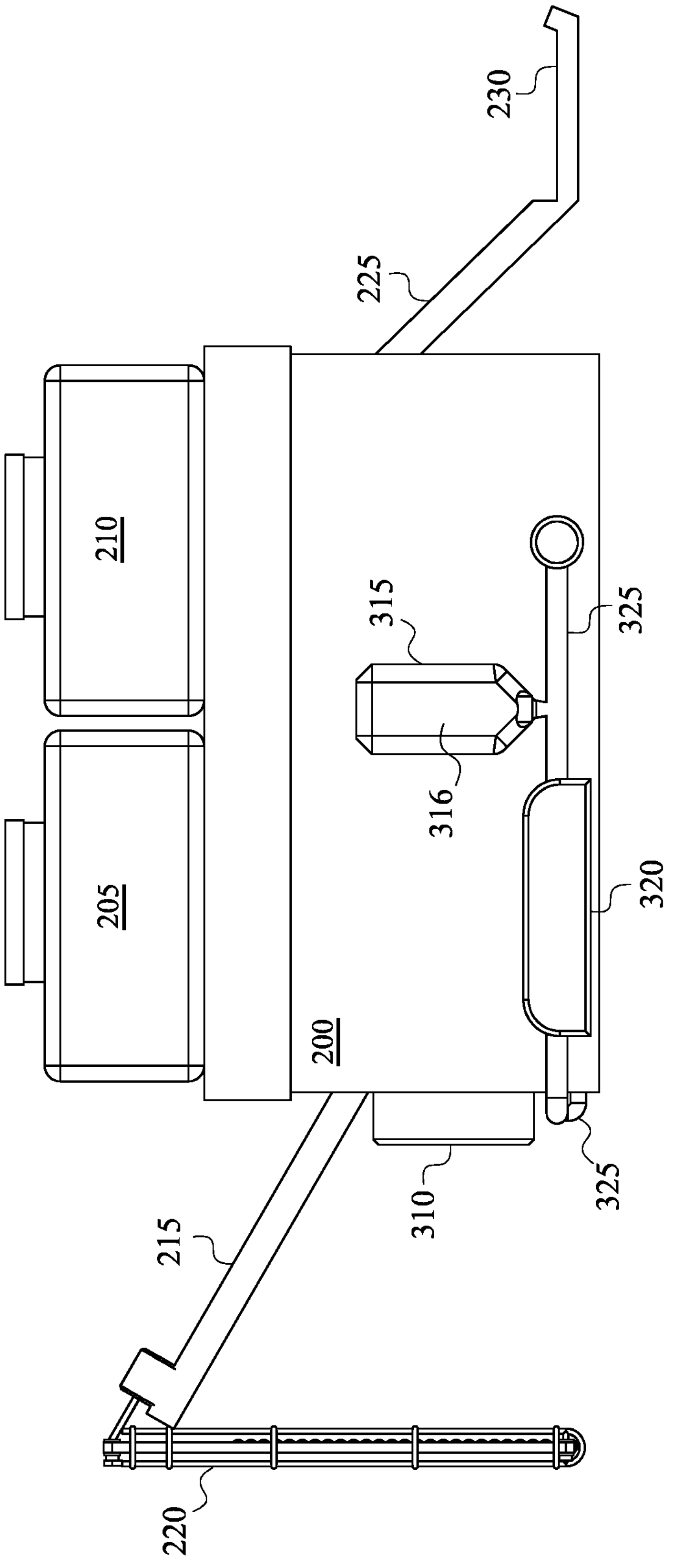
FIG. 3 illustrates a front view of the washing apparatus of FIG. 2, according to certain embodiments.
Figure 4:
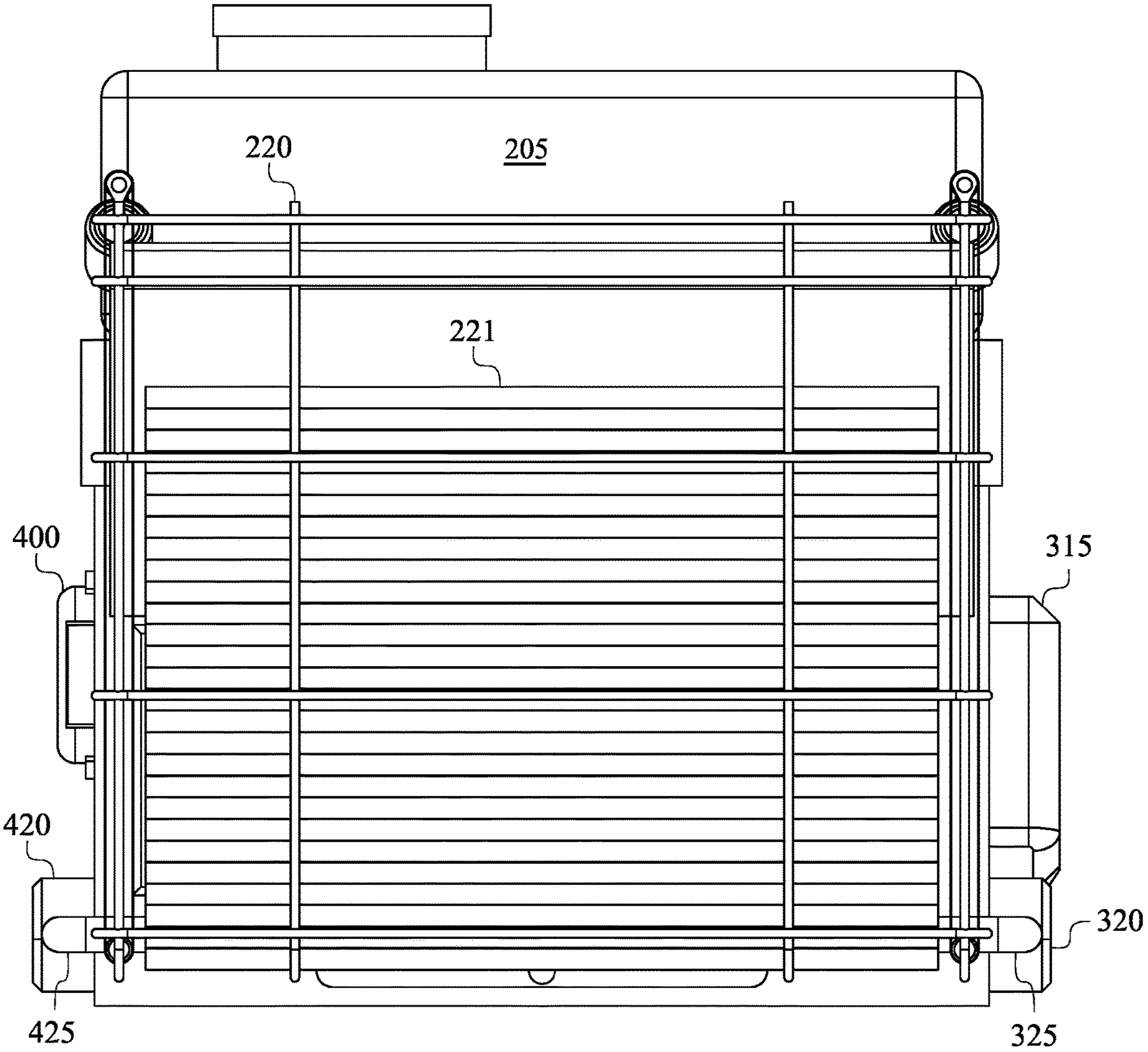
FIG. 4 illustrates a left view of the washing apparatus of FIG. 2, according to yet still other embodiments.
Figure 5:
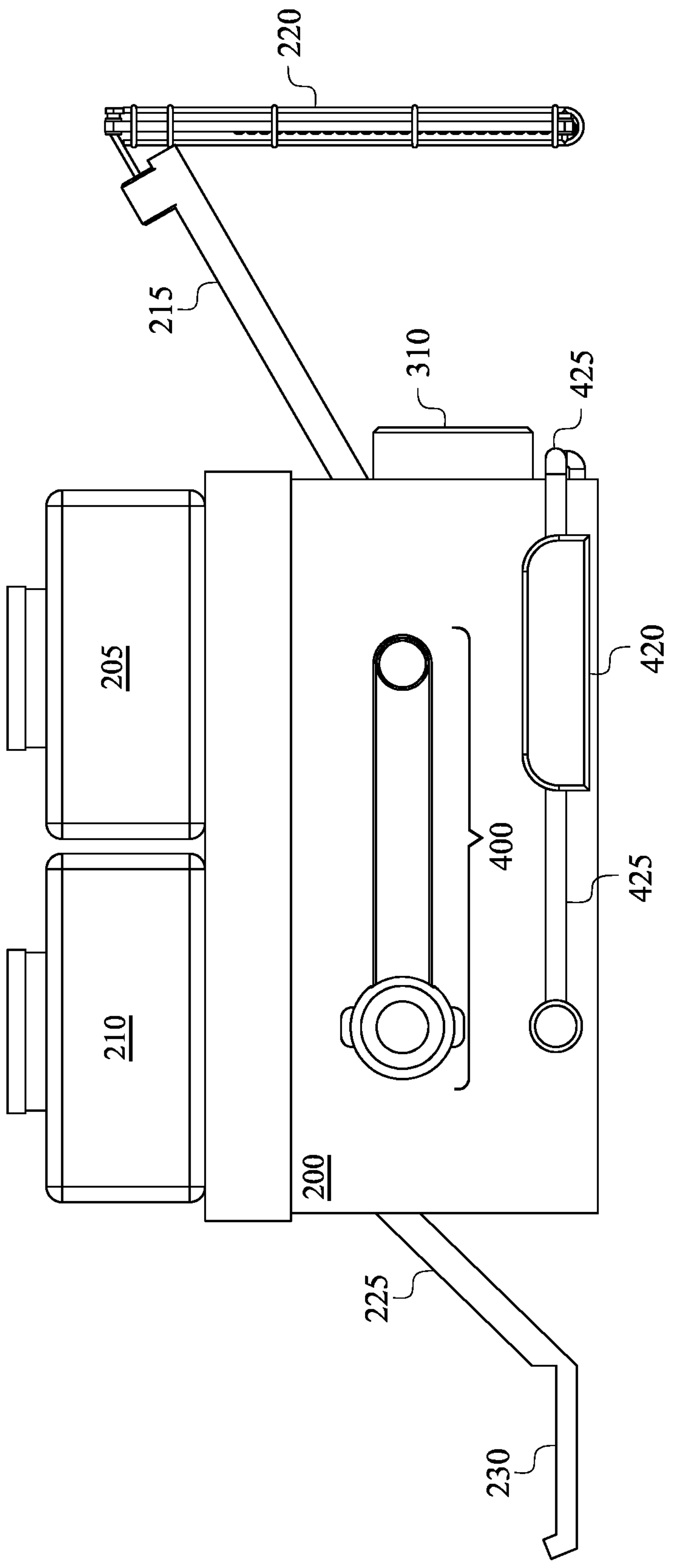
FIG. 5 illustrates a back view of the washing apparatus of FIG. 2 according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

The present disclosure includes many aspects and features. Moreover, while many aspects and features relate to, and are described in the context of reusable drinking straw washing apparatus, embodiments of the present disclosure are not limited to use only in this context.

In present times, non-biodegradable drinking straws are a common utensil sold and offered freely by commercial restaurants and grocers. These conventional drinking straws are generally accepted to be single-use, disposable items by most users, however the materials used to produce such straws are known to persist long after the straws have been disposed of. The environmental impact of this cumulative mass of plastics is a recognized hazard that has recently been addressed by public legislation banning the use of such single-use straws or mandating their manufacture from more eco-friendly materials such as plant fibers or paper. In response, durable straws formed from denser polymers, plastics, or metallic materials have become increasingly available on the market. Reusable straws enable a customer to condense costs for drinking straws into a one-time, upfront purchase to avoid both the cost and hassle of acquiring biodegradable straws.

Avoidance of excessive waste may also be a priority for the environmentally minded consumer, encouraging those individuals to seek a means to minimize their impact by foregoing recurring wasteful practices. However, with the repeated use of such utensils consumers are now required to cleanse their reusable straws—a requirement that had not been commonplace prior to the recognition and banning of conventional disposable straws. It is therefore contemplated that a means of effectively cleaning and sanitizing a large volume of reusable straws simultaneously is presently absent from, yet desirable to a segment of the market today.

Embodiments of the instant disclosure will now be described in detail with reference to the FIGS. The instant disclosure seeks to provide a reusable drinking straw washing apparatus that cleans and sanitizes reusable drinking straws. FIG. 1 depicts a block diagram of electronic components of a reusable drinking straw washing apparatus ("washing apparatus"), generally designated 100, in accordance with some embodiments. The washing apparatus 100 includes, but is not limited to, a motor assembly 115, a power source 130, a water pump 120, a contact switch 125, and a power switch 135 all interconnected via a control circuit 125. The control circuit 110 is a device that can perform one or more steps, functions, processes of the instant disclosure. For example, the control circuit 110 can be an electrical circuit comprising discrete electronic elements, packaged or integrated electronic chips containing logic gates, a circuit utilizing a microprocessor, or on a single chip containing electronic elements or microprocessors. The power supply 130 and the water pump 120 are preferably devices known in the art.

Figure 6:
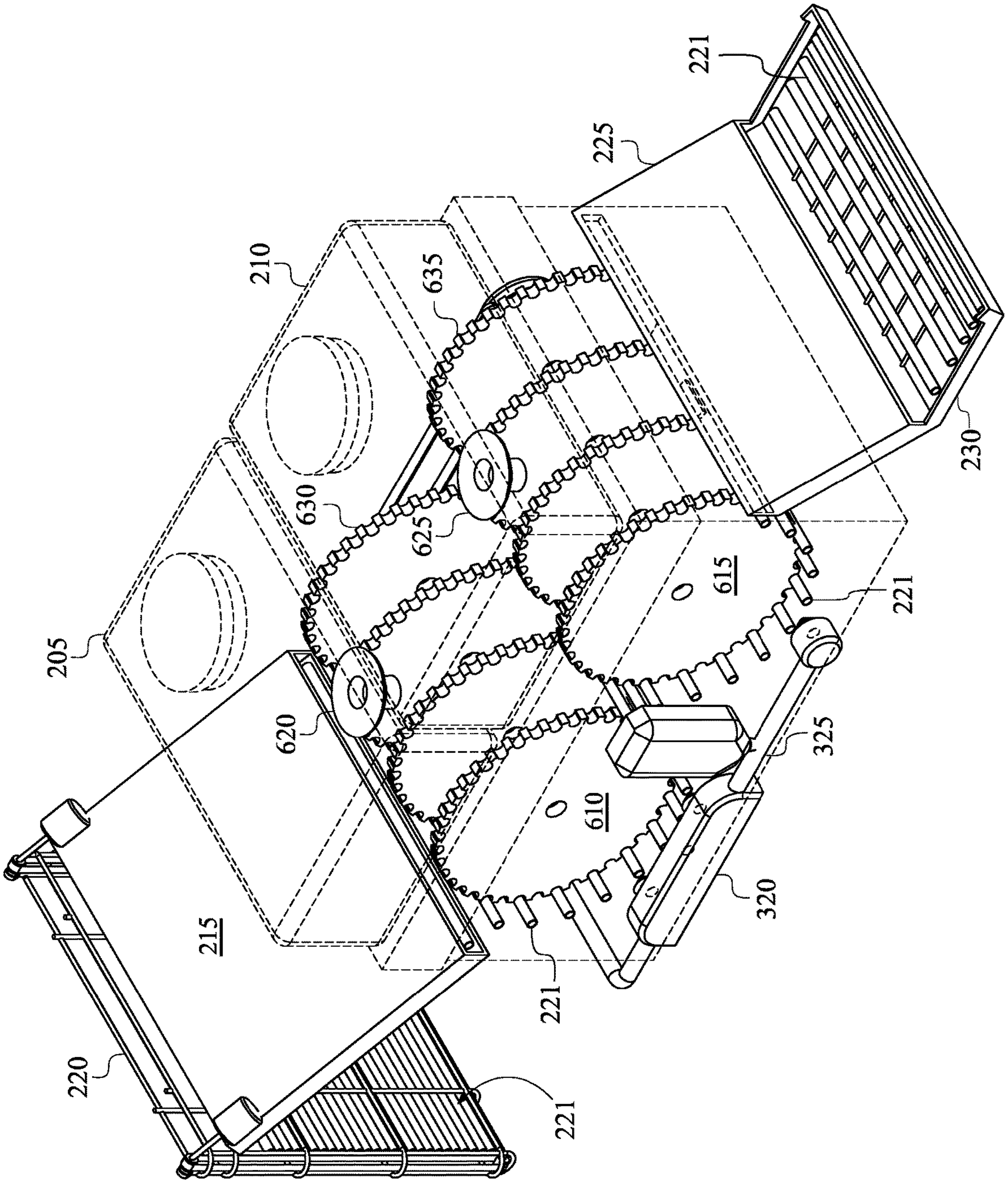
FIG. 6 illustrates a see-through view of the washing apparatus of FIG. 2, according to other embodiments.
Figure 7:
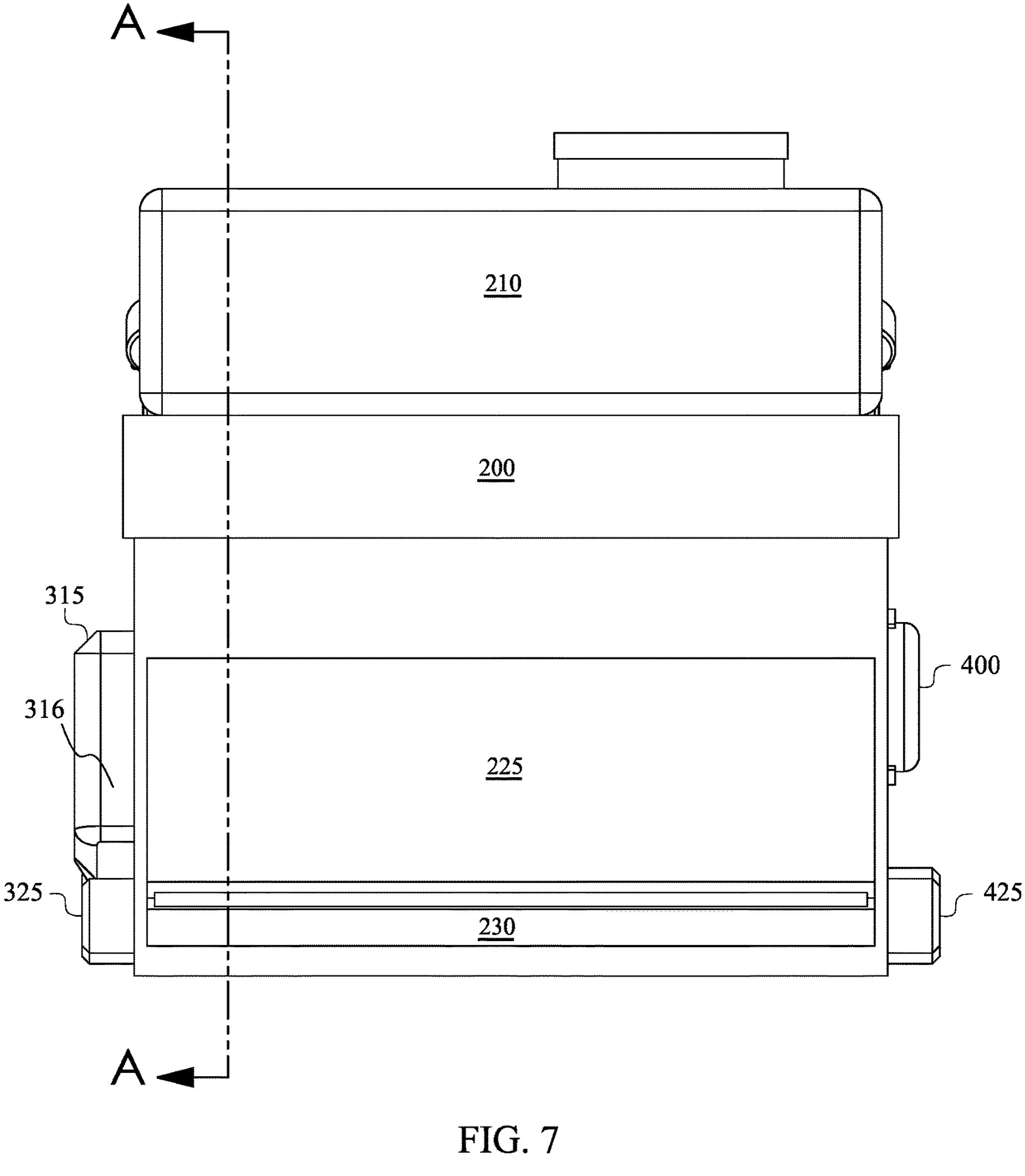
FIG. 7 illustrates a right view of the washing apparatus of FIG. 2, according to certain embodiments.
Figure 8:
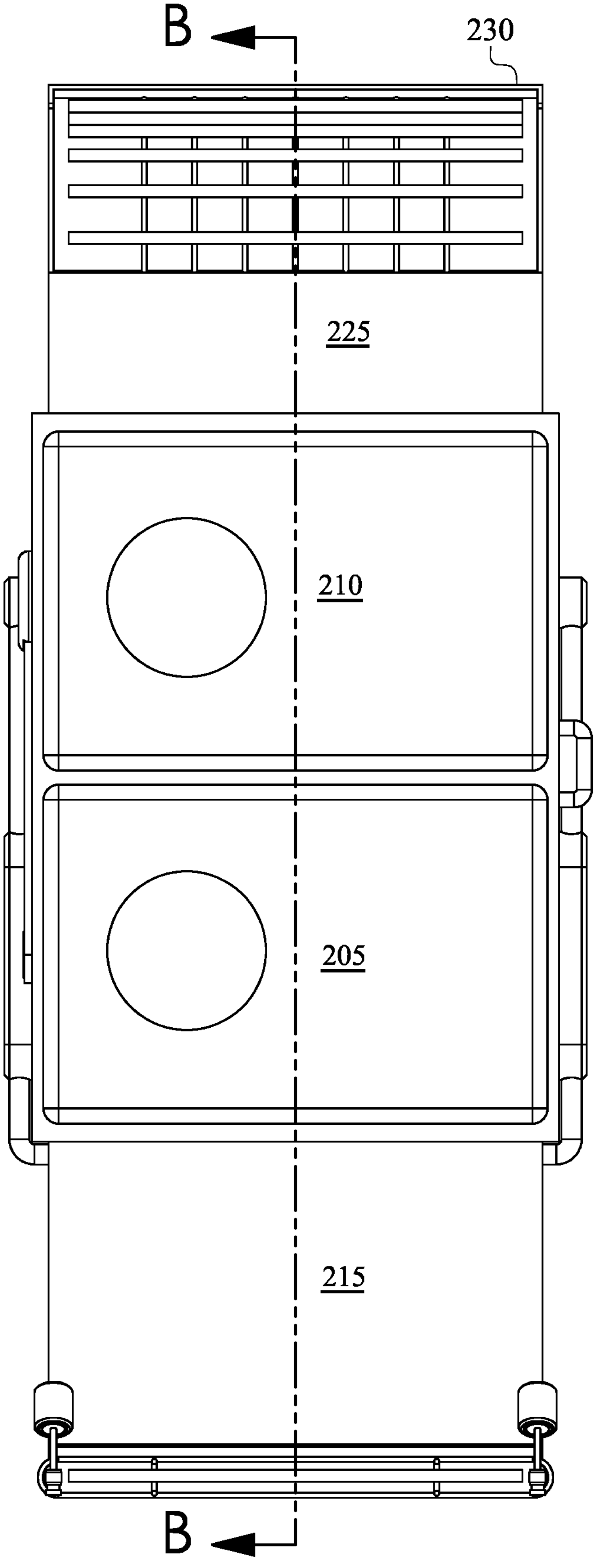
FIG. 8 illustrates a top view of the washing apparatus of FIG. 2, according to yet still other embodiments.
Figure 9:
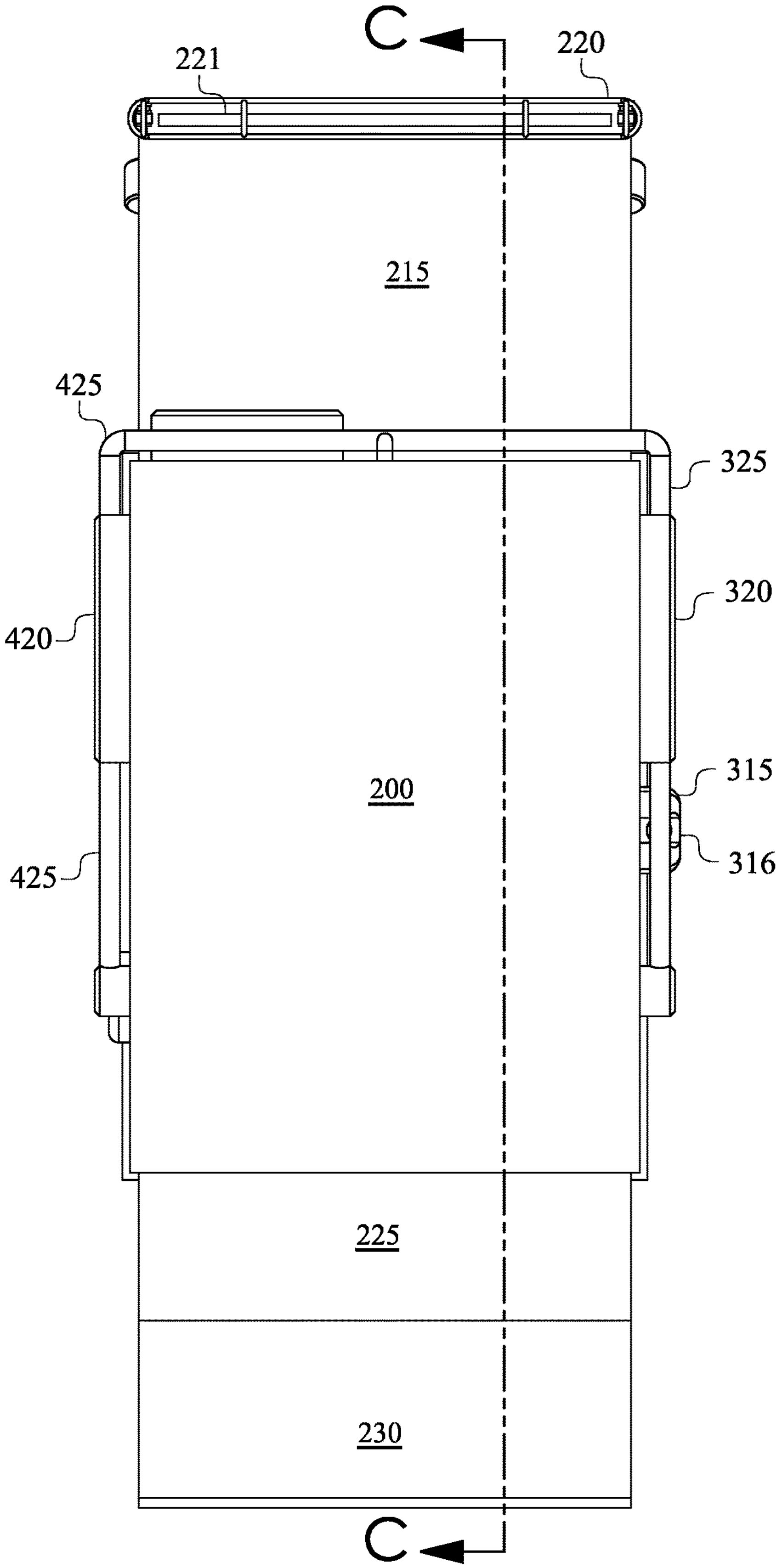
FIG. 9 illustrates a bottom view of according to some embodiments.
Figure 10:
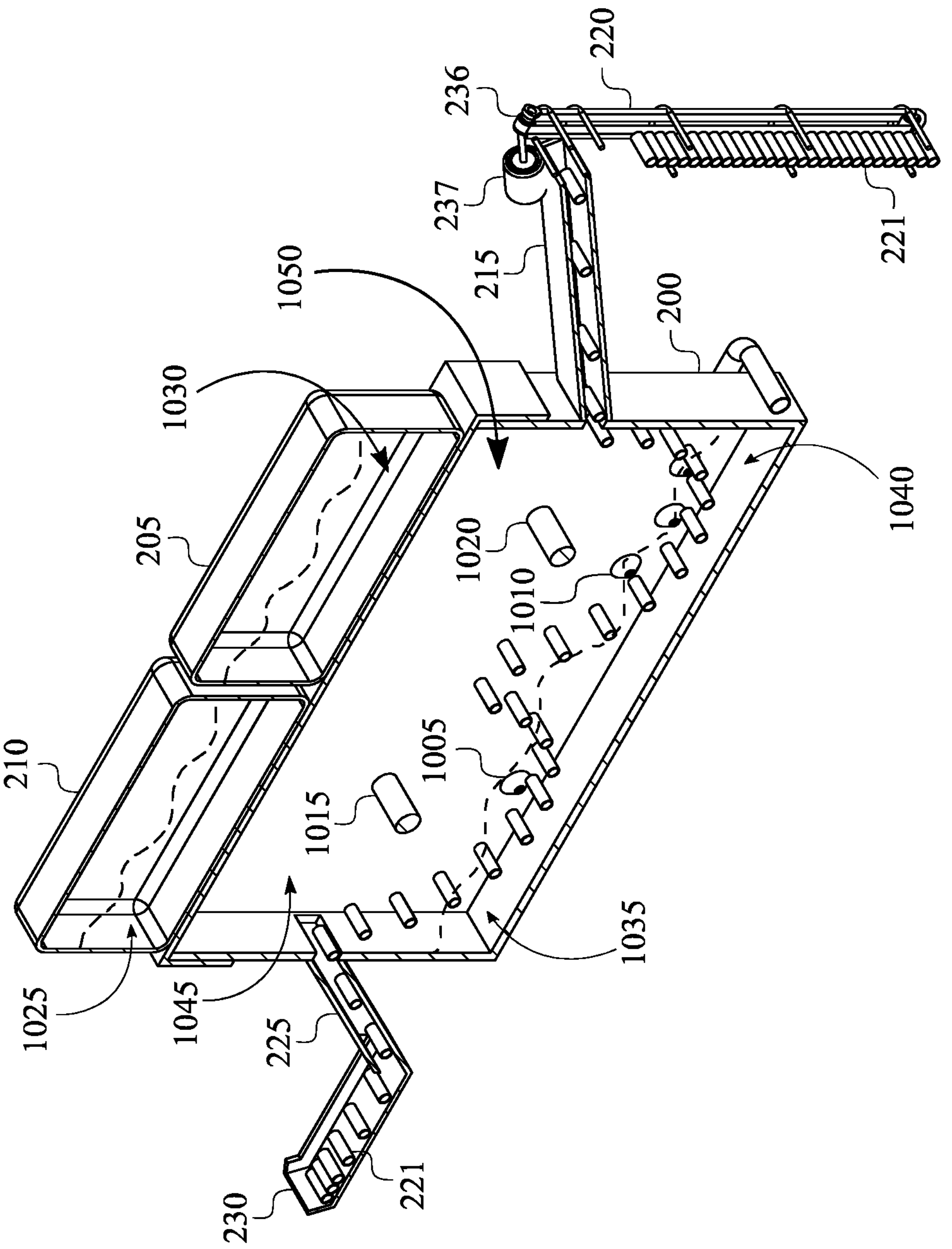
FIG. 10 illustrates View A of FIG. 7, according to other embodiments.
Figure 11:
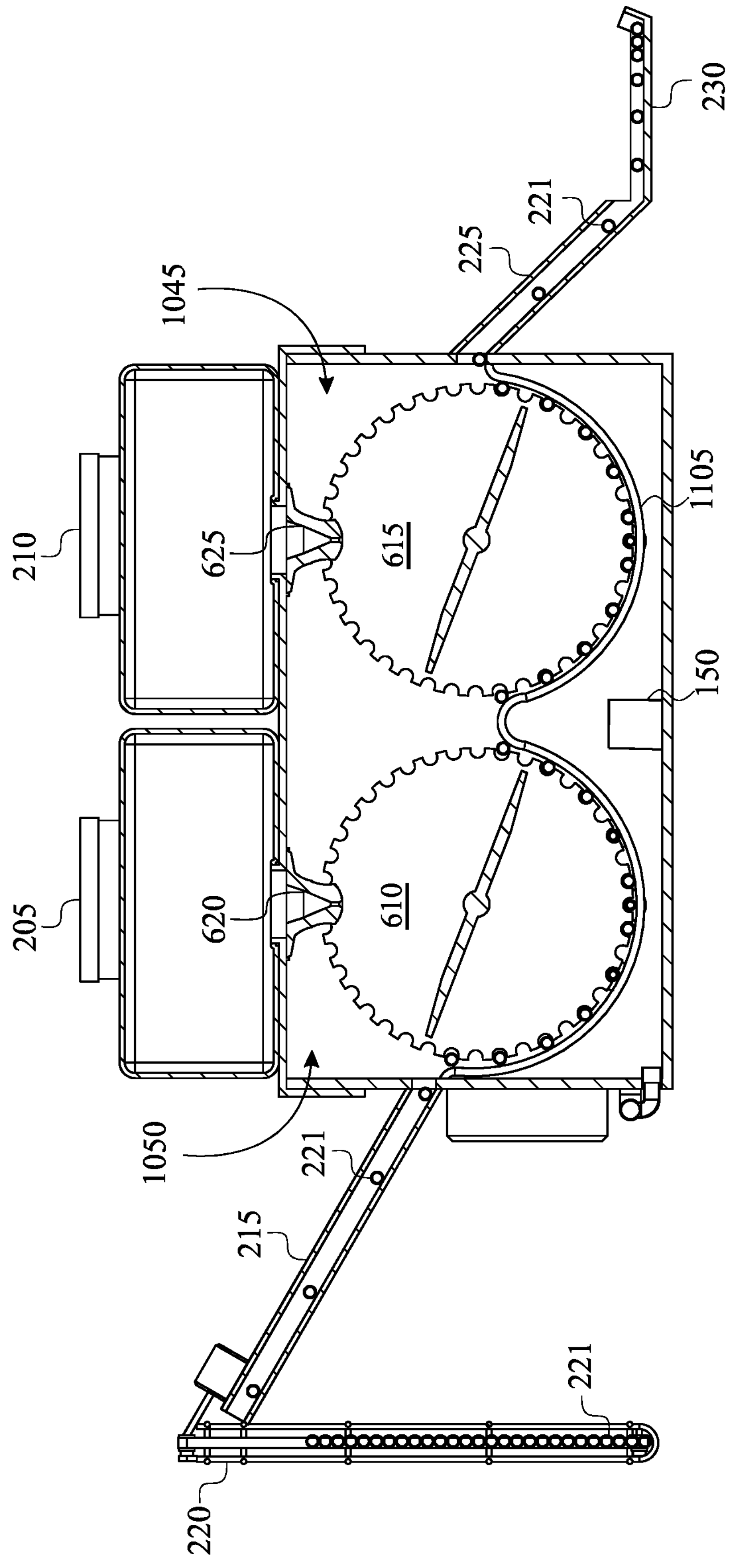
FIG. 11 illustrates View B of FIG. 8, according to certain embodiments.
Figure 12:
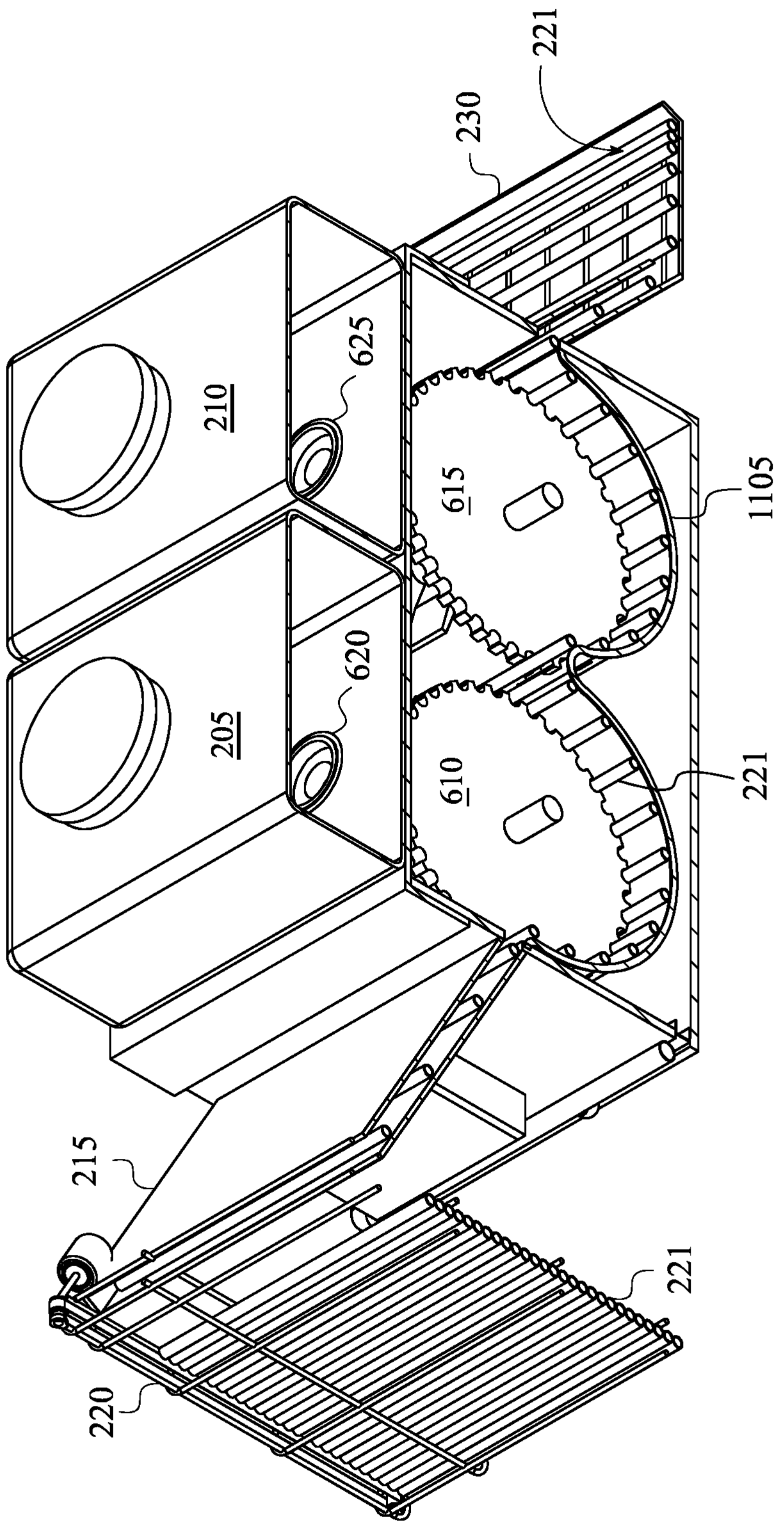
FIG. 12 illustrates View C of FIG. 9, according to yet still other embodiments.

FIGS. 2-5, 7-9 illustrates a perspective view, front view, left view, back view, right view, top view, and bottom view of the washing apparatus 100, according to certain embodiments. FIG. 6 illustrates a see-through view of the washing apparatus 100, according to other embodiments. FIG. 10 illustrates View A of FIG. 7, according to yet still other embodiments. FIG. 11 illustrates View B of FIG. 8, according to some embodiments. FIG. 12 illustrates View C of FIG. 9, according to some embodiments.

The washing apparatus 100 preferably includes a primary container 200, an inlet slide 215, a straw load assist container 220, an outlet slide 225, and a drip tray 230. Reusable straws 221 are cleaned and sanitized within the primary container 200. The primary container 200 is preferably an open top container that includes a wash region 1050 positioned adjacent to a sanitizing region 1045. The wash region 1050 is not fluidically coupled to the sanitizing region 1045 to separate the wash and sanitizing functions of the washing apparatus 100 and reduce contamination risks. In other words, the wash region 1050 and the sanitizing region are physically and fluidically separated from each other. The primary container 200 further includes at least one straw retaining track 1105 (preferably two or more) that traverses the wash region 1050 and the sanitizing region 1045. The straws 221 traverse the straw retaining track 1105 lengthwise. To be sure, the straw retaining track 1105 initiates proximate to the coupling point between the inlet slide 215 and the primary container 200 (i.e., the point of entry for the straws 221) as well as terminates proximate to the coupling point between the outlet slide 225 and the primary container 200 (i.e., the exit point for the straws 221).

The straw retaining track 1105 is preferably an elongated structure that the straws 221 rests against as they traverse the wash region 1050 and the sanitizing region 1045. The straw retaining track 1105 assists in guiding the straws 221 through the cleaning solution 1040 and the sanitizing solution 1035 (discussed further below). The primary container 200 also includes a motor assembly 115 externally affixed thereto. In some embodiments, the motor assembly 115 is internally affixed to the primary container 200. The wash region 1050 includes at least one washing cogwheel 610 (preferably several) rotatably positioned therein (e.g., via post 1020). In general, the washing cogwheel 610 is a rotatable component that manipulates the straws 221 within the wash region 1050. The washing cogwheel 610 is a circular symmetric disc that include a plurality of washing paddles 630 that extend radially therefrom.

The spacing between the washing paddles 630 is preferably greater than the diameter of the straw 210, which allows one or more of the straws 221 to be positioned therein. The washing paddles 630 can have any shape that facilitates one or more embodiments of the instant disclosure. The post 1020 is orthogonally oriented relative to the washing cogwheels 610 and the straw retaining track 105. The washing cogwheel 610 receives straws 221 via the straw retaining track 1105, which is positioned proximate thereto. The washing cogwheel 610 is oriented parallel to the straw retaining track 1105. To be sure, the distance between the washing cogwheel 610 and the straw retaining track 1105 allows straws 221 to be positioned therebetween as they are cleaned and sanitized. The angle of curvature (i.e., the arc) of the straw retaining track 1105 is substantially similar to that of the washing cogwheel 610, which allows the washing cogwheel 610 to rotate and thereby move the straws 221 along the straw retaining track 1105.

The motor assembly 400 is mechanically coupled to the washing cogwheel 610 (e.g., via the post 1020 and one or more gears and/or pulleys) and thereby rotates the washing cogwheel 610 to guide the straws 221 along the straw retaining track 1105 and through a cleaning solution 1040 included in the wash region 1050.

In the same vein, the sanitizing region 1045 includes a sanitizing cogwheel 615 rotatably positioned therein (e.g., via post 1015) that receive straws 221 from the washing region 1050 via the straw retaining track 1105. In general, the sanitizing cogwheel 615 is a rotatable component that manipulates the straws 221 within the sanitizing region 1045. The sanitizing cogwheel 615 is a circular disc that include a plurality of sanitizing paddles 635 that extend radially therefrom. The sanitizing paddles 635 can have any shape that facilitates one or more embodiments of the instant disclosure. The spacing between the sanitizing paddles 635 is preferably greater than the diameter of the straw 210, which allows one or more of the straws 221 to be positioned therein. The post 1015 is positioned orthogonal to the washing cogwheels 610 and the straw retaining track 105.

The sanitizing cogwheel 615 is oriented parallel to the straw retaining track 1105 and the washing cogwheel 610. The motor assembly 400 is mechanically coupled to the sanitizing cogwheel 615 (e.g., via one or more gears and/or pulleys) and thereby rotates the sanitizing cogwheel 615 to guide straws 221 (e.g., lengthwise) along the straw retaining track 1105, through a sanitizing solution 1035 in the sanitizing region 1045, and out of the sanitizing region 1045.

A soap reservoir 205 is preferably demountably positioned on the top of the primary container 200 proximate to the wash region 1050. A detergent solution 1030 is preferably included the soap reservoir 205. The detergent solution 1030 can be any detergent known in the art that can be used to clean eating utensils. The soap reservoir 205 includes a first nipple 620 that is oriented towards and positioned proximate to the washing cogwheel 610 (i.e., oriented down). The first nipple 620 is fluidically coupled to the soap reservoir 205 such that the first nipple 620 releases the detergent solution 1030 when struck by one or more washing paddles 630. For example, the first nipple 620 can release the detergent solution 1030 directly on the washing paddle 630 for subsequent release in to the cleaning solution 1040 and/or release the detergent solution 1030 directly in to the cleaning solution 1040. The user may open part of the primary container 200 along with soap reservoir 205 to clean the inside of the primary container 200.

Similarly, a sanitizer reservoir 210 is demountably positioned on top of the primary container 200 proximate to the sanitizing region 1045. A sanitizer solution 1025 is preferably included in the sanitizer reservoir 210. The sanitizer solution 1025 can be any sanitizer known in the art that sanitizes eating utensils and poses no health risks to human. The sanitizer reservoir 210 includes a second nipple 625 oriented towards and positioned proximate to the sanitizing cogwheel 615. The second nipple 625 is fluidically coupled to the sanitizer reservoir 210 such that the second nipple 625 releases the sanitizer solution 1025 when struck by a sanitizing paddle 635. For example, the second nipple 625 can release the sanitizer solution 1025 directly on the sanitizing paddle 635 for subsequent release in to the sanitizing solution 1035 and/or release the sanitizer solution 1025 directly in to the sanitizing solution 1035. The user may open part of the primary container 200 along with sanitizer reservoir 210 to clean the inside of the primary container 200.

Although the motor assembly 400 is used to move the straws 221 through the wash region 1050, the washing apparatus 100 preferably uses gravity to move the straws 221 in to as well as away from the primary container 200. For example, the inlet slide 215 is angularly coupled to the primary container 200 proximate to the wash region 1050 and thereby uses gravity to provide straws 221 to the straw retaining track 1105. In other words, the inlet slide 215 is a guiding surface or feeding mechanism that extends up and away from the primary container 200. A straw load assist container 220 is preferably hinge coupled to the inlet slide 215 opposite the primary container 200 via its opening and stores straws 221 therein. Here, the straw load assist container 220 uses gravity to provide straws 221 to the inlet slide 215 when positioned in plane with the inlet slide 215. Once the straws 221 are positioned within the inlet slide 215 they are ready to enter the primary container and be received by the straw retaining track 1105

Although the washing apparatus 100 can be operated via the power switch 135, alternative operating solutions also exist. The washing apparatus 100 can further include one or more contact switches 235 that are each communicatively coupled to the control circuit 110. Each contact switch 235 includes an electrical contact 236 and an electrical contact 237 (hereinafter "electrical contacts") that are each peripherally affixed to the inlet slide 215 and the straw load assist container 220, respectively, that contact each other when the inlet slide 215 is positioned in plane with the straw load assist container 220. The circuit of the contact switch 235 is closed when the electrical contact 236 and an electrical contact 237 contact each other. In other words, the control circuit 110 is configured to activate the motor assembly 400 when the electrical contacts contact each other.

The washing apparatus 100 further includes a water pump 120 communicatively coupled to the control circuit 110 and fluidically coupled to the sanitizing solution 1035. The water pump 120 includes a first nozzle 1010 that is positioned within the wash region 1050 as well as a second nozzle 1005 positioned within the sanitizing region 1045. The first nozzle 1010 and the second nozzle 1005 are each oriented orthogonal to and positioned proximate to the straw retaining track 1105.

To clean each of the straws 221, the water pump 120 disperses, via the first nozzle 1010, the cleaning solution 1040 within the straws 221 that travel along the straw retaining track 1105. To sanitize each of the straws 221, the water pump disperses 120, via the second nozzle 1005, the sanitizing solution 1035 within straws that travel along the straw retaining track 1105. To be sure, the orthogonal positioning of the first nozzle 1010 and the second nozzle 1005 relative to the straw retaining track 1105 allows each component to forcibly move the aforementioned solutions through the inside of the straws 221 as they pass by.

The washing apparatus 100 preferably further includes an outlet slide 225 that is angularly coupled to the primary container 200 opposite the inlet slide and positioned proximate to the sanitizing region 1045. The outlet slide 225 is a guiding surface or feeding mechanism that preferably extends down and away from the primary container 200 and receives straws 221 from the straw retaining track 1105 as they exit the sanitizing region 1045. A drip tray 230 is preferably coupled to the outlet slide 225 opposite the primary container 200. Due to its angular positioning, the outlet slide 225 uses gravity to provide straws 221 to the drip tray 210.

The drinking straw washing apparatus further comprise an ultrasonic cleaner 150, which is communicatively coupled to the control circuit 110. The ultrasonic cleaner 150 is coupled to the floor of the primary container 200 and adjacently positioned to the washing cogwheel 610. The ultrasonic cleaner 150 is configured to provide another layer of disinfection and clean the straws at a molecular level.

Although the disclosure has been explained in relation to its preferred embodiment, it is to be understood that many other possible modifications and variations can be made without departing from the spirit and scope of the disclosure.

The invention claimed is:

1. A drinking straw washing apparatus, comprising:
- a primary container comprising:
  - a wash region;
  - a sanitizing region positioned adjacent to the wash region;
  - a straw retaining track that traverses the wash region and the sanitizing region;
  - a motor assembly communicatively coupled to a control circuit;
- wherein
  - the wash region comprises a washing cogwheel rotatably positioned therein that receives straws via the straw retaining track;
  - the washing cogwheel is oriented parallel to the straw retaining track;
  - the motor assembly is mechanically coupled to the washing cogwheel and thereby rotates the washing cogwheel to guide the straws along the straw retaining track and through a cleaning solution included in the wash region;
  - the sanitizing region comprises a sanitizing cogwheel rotatably positioned therein that receives the straws from the washing region via the straw retaining track;
  - the sanitizing cogwheel is oriented parallel to the straw retaining track and the washing cogwheel; and
  - the motor assembly is mechanically coupled to the sanitizing cogwheel and thereby rotates the sanitizing cogwheel to guide the straws along the straw retaining track, through a sanitizing solution in the sanitizing region, and out of the sanitizing region.

2. The drinking straw washing apparatus of claim 1, further comprising:
- a soap reservoir comprising a detergent solution;
- a sanitizer reservoir comprising a sanitizer solution;
- wherein
  - the soap reservoir
    - is demountably positioned on a top of the primary container proximate to the wash region; and
  - the sanitizer reservoir is demountably positioned on the top of the primary container proximate to the sanitizing region.

3. The drinking straw washing apparatus of claim 2, wherein
- the washing cogwheel comprises a plurality of washing paddles that extend radially therefrom;
- the soap reservoir comprises a first nipple oriented towards and positioned proximate to the washing cogwheel; and
- the first nipple releases the detergent solution when struck by a washing paddle.

4. The drinking straw washing apparatus of claim 3, wherein
- the sanitizing cogwheel comprises a plurality of sanitizing paddles that extend radially therefrom;
- the sanitizer reservoir comprises a second nipple oriented towards and positioned proximate to the sanitizing cogwheel; and
- the second nipple releases the sanitizer solution when struck by a sanitizing paddle.

5. The drinking straw washing apparatus of claim 4, further comprising:
- an inlet slide angularly coupled to the primary container proximate to the wash region and thereby uses gravity to provide the straws to the straw retaining track;
- a straw load assist container coupled by a hinge to the inlet slide via its opening and stores the straws; and
- wherein the straw load assist container uses gravity to provide the straws to the inlet slide when positioned in plane with the inlet slide.

6. The drinking straw washing apparatus of claim 5, further comprising:
- a contact switch;
- wherein
  - the contact switch is communicatively coupled to the control circuit;
  - the contact switch comprises electrical contacts that are peripherally affixed to the inlet slide and the straw load assist container that contact each other when the inlet slide is positioned in plane with the straw load assist container; and
  - the control circuit is configured to activate the motor assembly when the electrical contacts contact each other.

7. The drinking straw washing apparatus of claim 6, further comprising:
- an outlet slide angularly coupled to the primary container opposite the inlet slide and positioned proximate to the sanitizing region;
- wherein
  - the outlet slide
    - extends down and away from the primary container; and
    - receives the straws from the straw retaining track.

8. The drinking straw washing apparatus of claim 7, further comprising:
- a drip tray coupled to the outlet slide opposite the primary container; and the outlet slide uses gravity to provide straws to the drip tray.

9. The drinking straw washing apparatus of claim 8, further comprising: a ultrasonic cleaner; wherein the ultrasonic cleaner is communicatively coupled to the control circuit; is coupled to a floor of the primary container; and adjacently positioned to the washing cogwheel.

* * * * *